United States Patent Office 3,324,639
Patented June 13, 1967

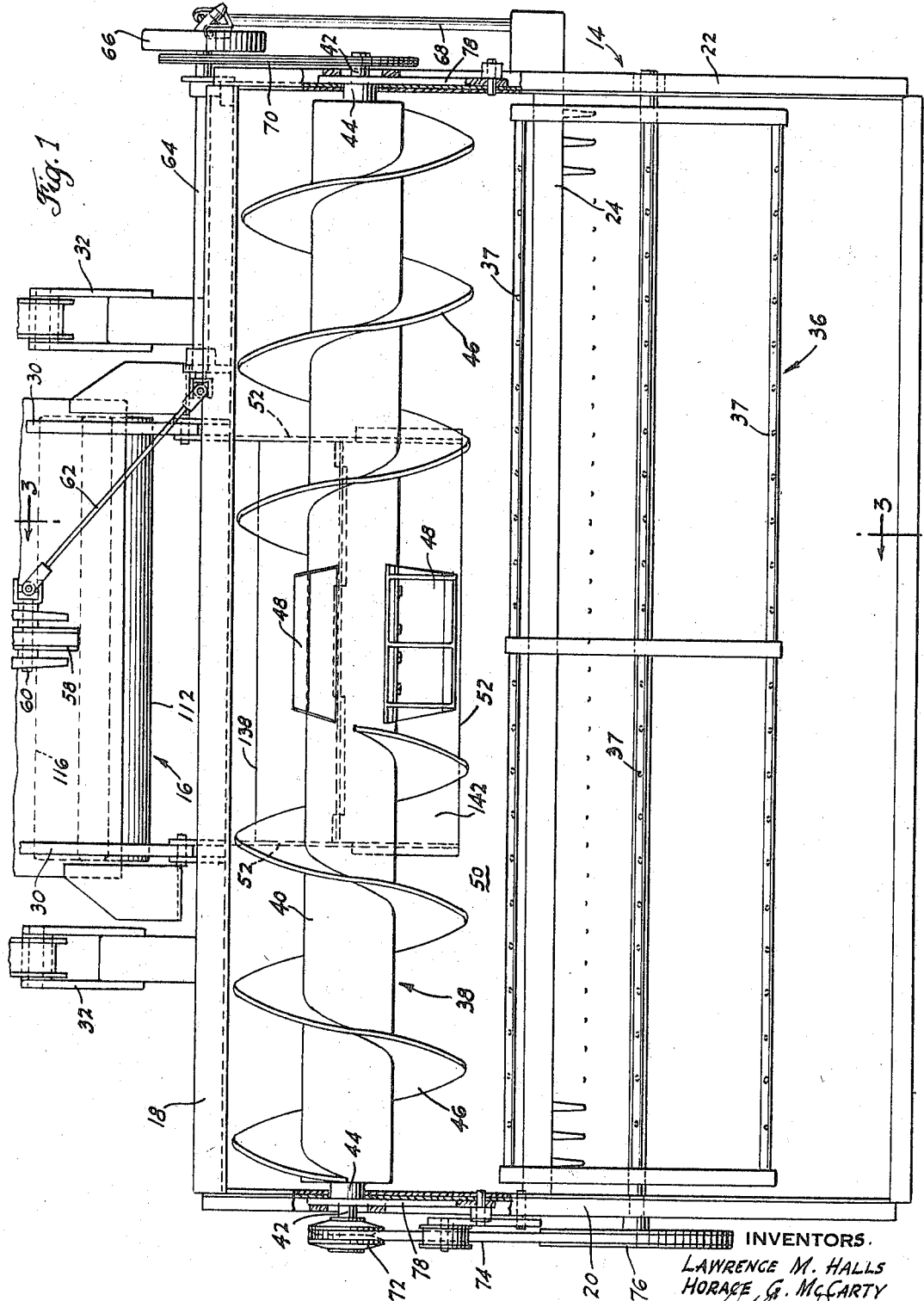

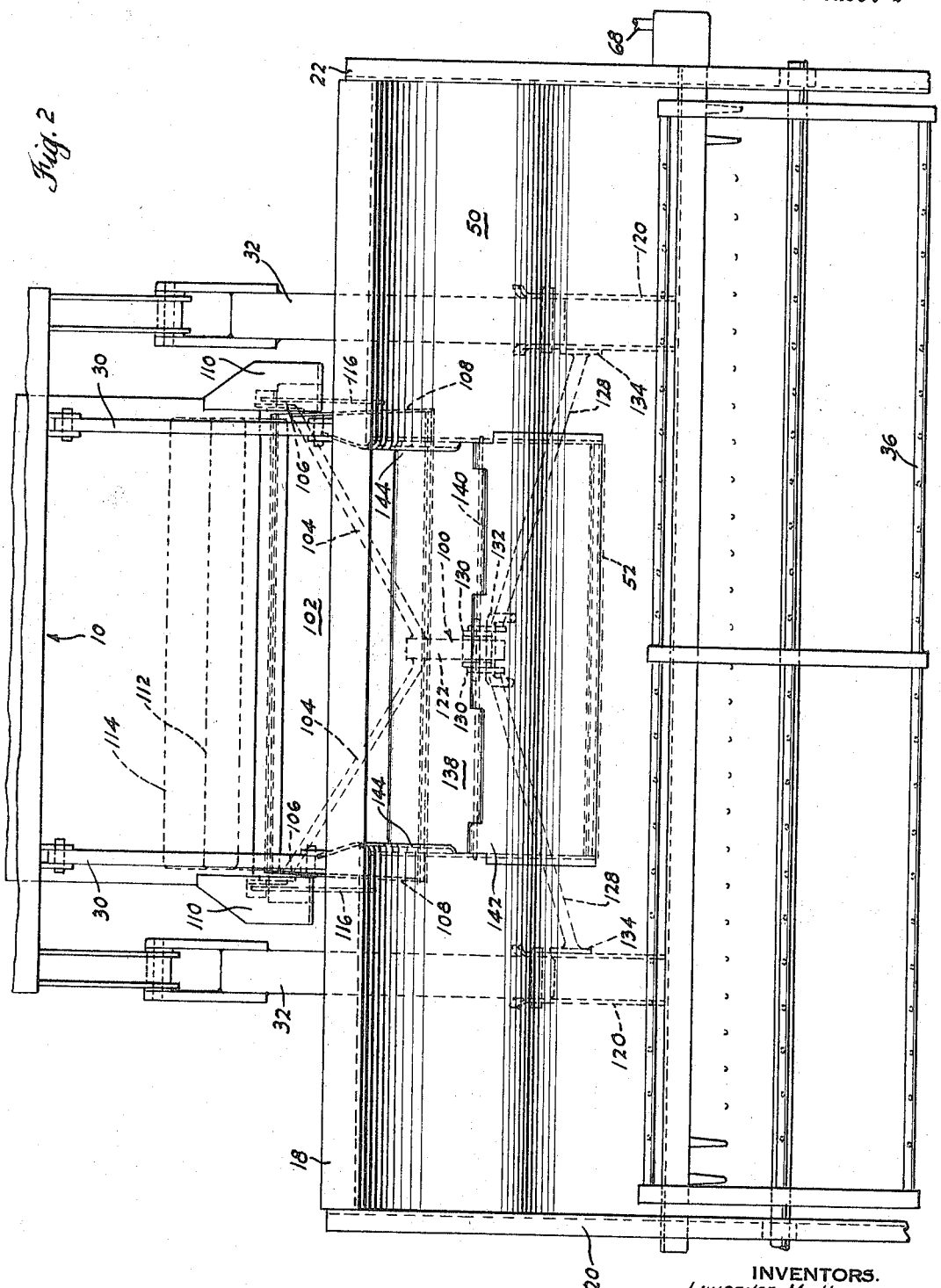

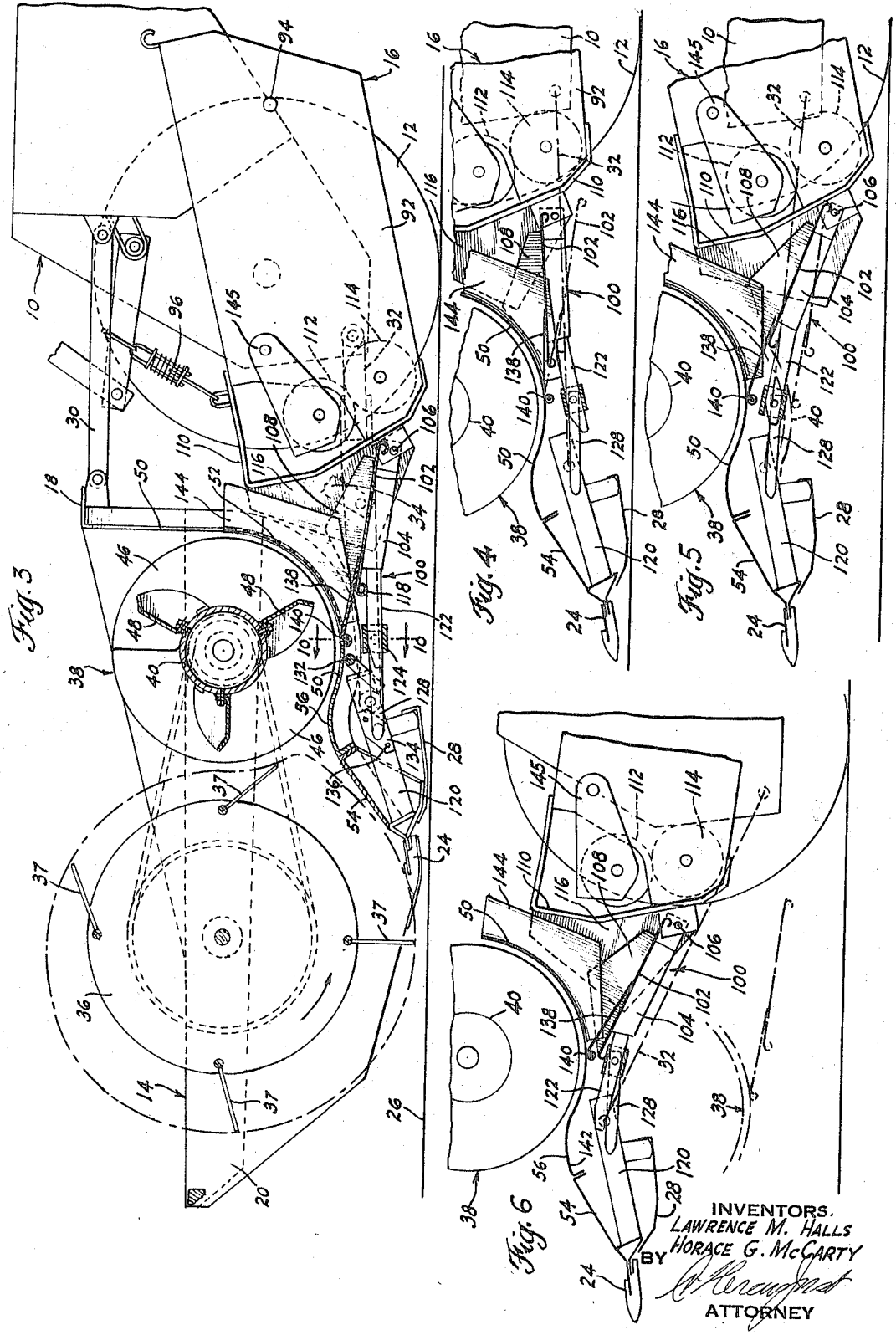

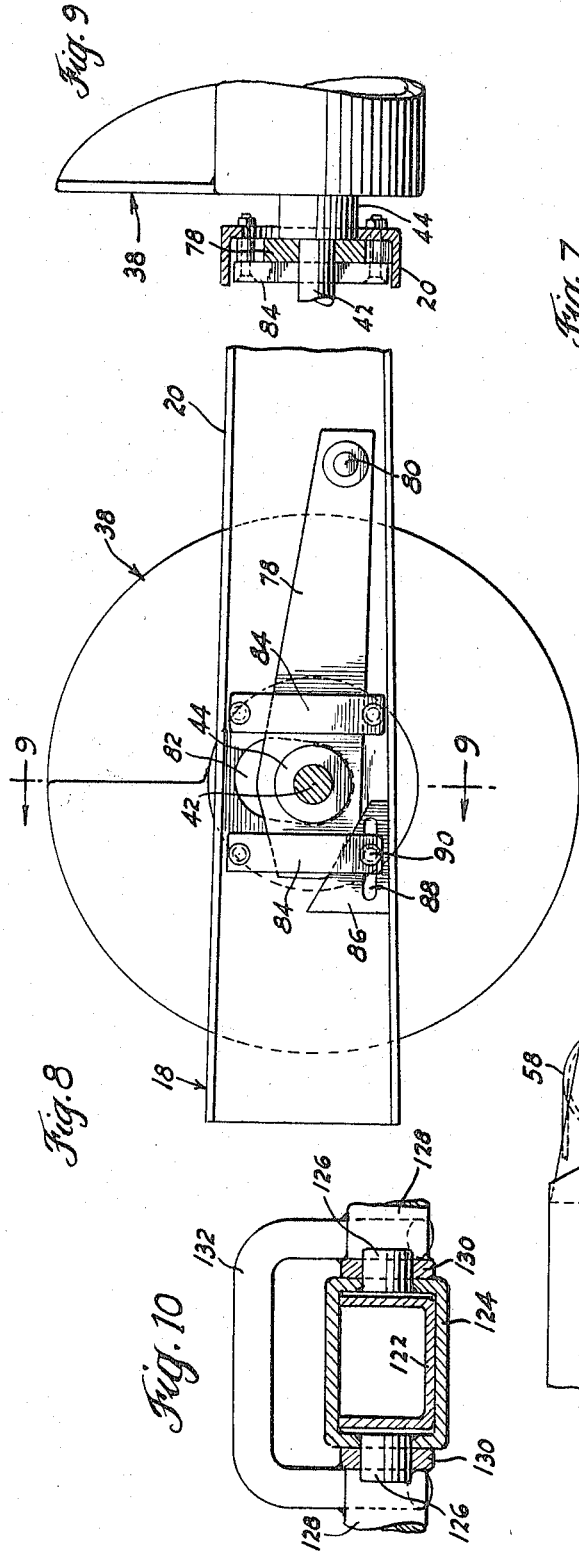
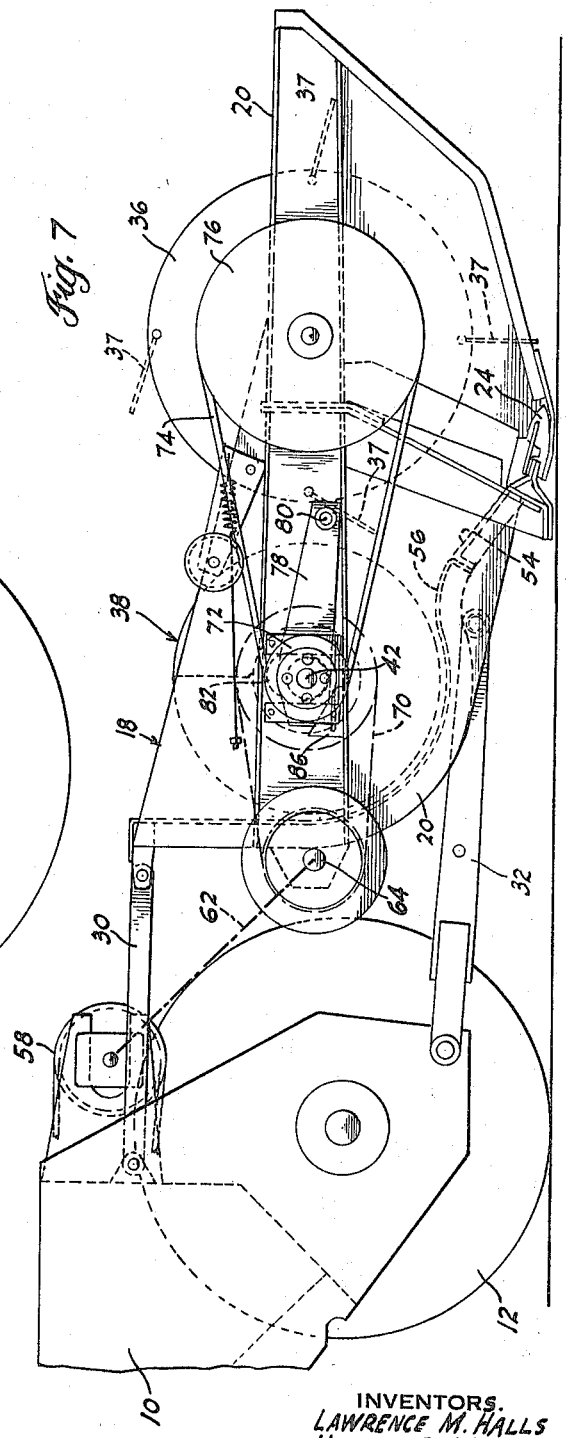

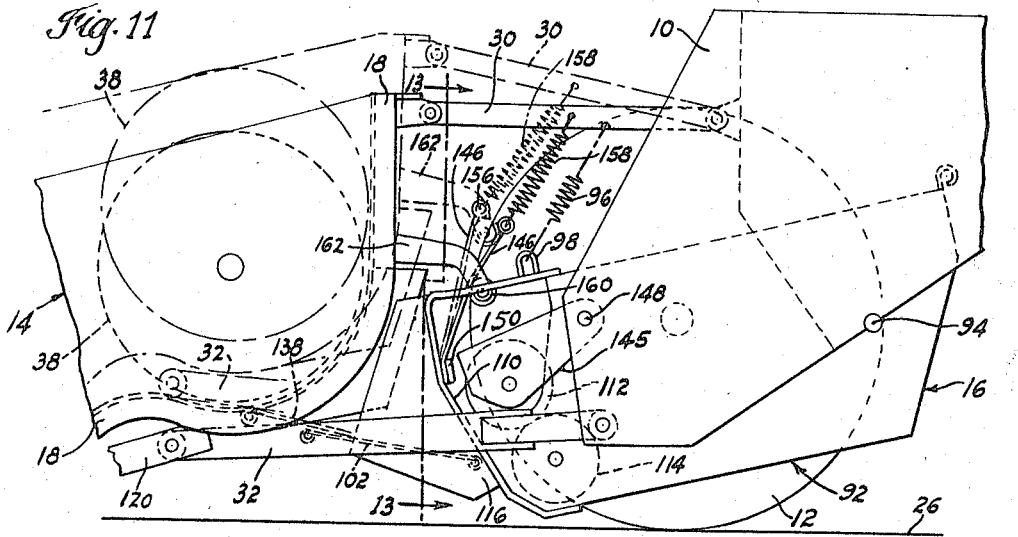
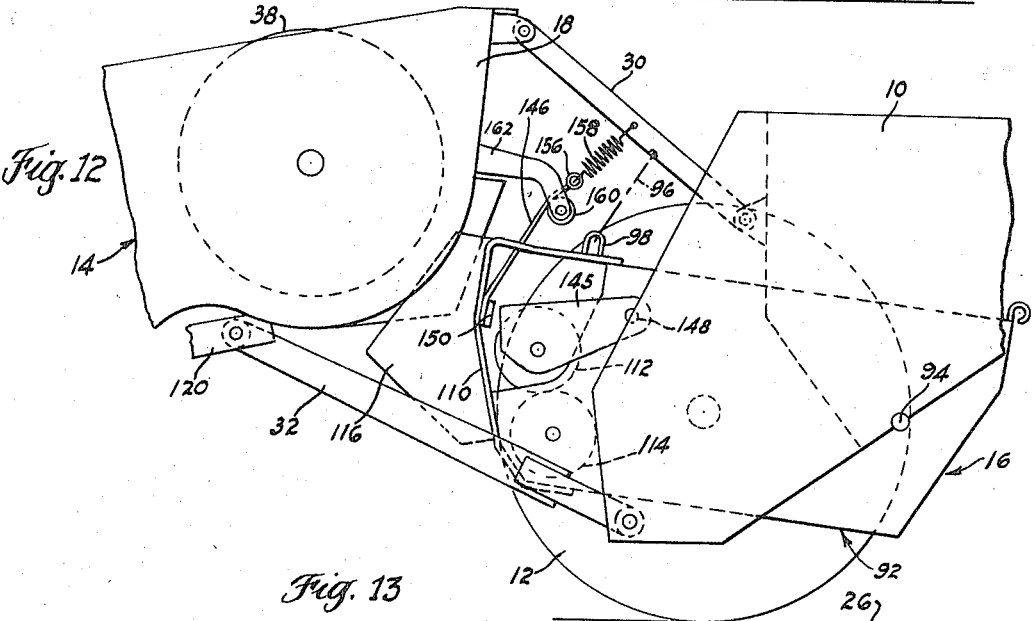
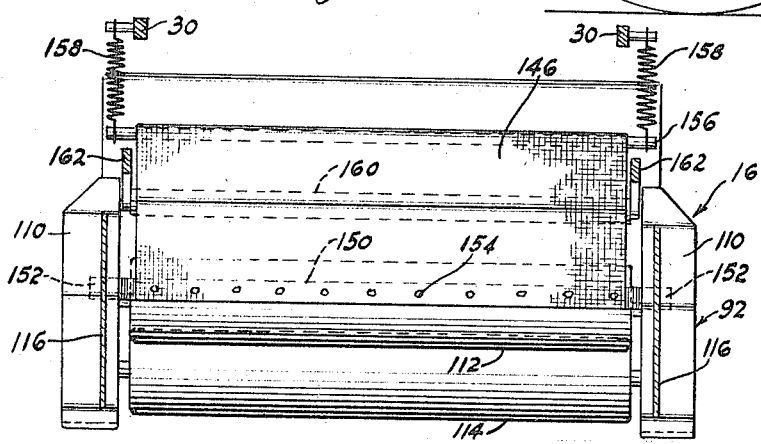

3,324,639
AUGER HEADER AND CROP CONDITIONER
Lawrence M. Halls and Horace G. McCarty, New Holland, Pa., assignors to Sperry Rand Corporation, New Holland, Pa., a corporation of Delaware
Filed July 23, 1964, Ser. No. 384,757
9 Claims. (Cl. 56—23)

This invention pertains to an auger header connectable for support to the forward end of a tractor which usually is of a specialized type for the purpose and, with the header connected thereto, comprises what is known in agricultural circles as a swather or windrower. The present invention also contemplates the selective use of a crop conditioner unit with said header, rearwardly thereof, and supported by the tractor independently of the header.

In modern agriculture, especially in regard to harvesting forage crops, it is the present tendency to cut a relatively wide swath of the crop within a range of anywhere between 10 and 16 or more feet in width, and then consolidate the crop into a narrower, substantially continuous windrow, in which form the crop is left to dry in the field until the moisture content has been reduced to a value suitable for subsequent harvesting operations such a baling. The arranging of the crop into a continuous windrow around the field primarily is to facilitate the baling thereof.

At present, most swather or windrower implements employ endless draper conveyors for purposes of consolidating a relatively wide swath of cut material into a narrower band thereof which is discharged onto the field as a windrow. Such devices offer various types of difficulties in that, as is well known, endless conveyors in agricultural equipment gradually stretch and also are subject to rather rapid wear, especially if carelessly used.

It is the principal object of the present invention to provide a header employing an auger supported by a frame of substantial width which is connectable to the forward end of a tractor, the header preferably being supported in a floating manner. Said header also includes a sickle bar assembly and a rotary reel to impell the material toward said assembly to facilitate cutting thereof, the auger having oppositely spiraled flights extending inwardly from opposite ends thereof toward the middle and the header having discharge means adjacent the central portion of the auger. More particularly, said header includes guide means extending upwardly and rearwardly from the cutter bar assembly toward the auger to insure the feeding of cut crop material so as to pass beneath the axis of the auger and thereby minimize the winding of material around the axial tube of the auger and otherwise minimize the impeding of the consolidation of the material by the auger prior to discharge thereof through the exit means.

Another object of the invention is to position said guide means referred to above so as to extend substantially tangentially toward the central tube of the auger from which the flights radially extend outwardly, thereby contributing to the beneficial results described above.

A further object of the invention is to mount the auger on suitable support means which will permit limited floating of the auger upwardly with respect to an arcuate shield extending transversely between the opposite ends of the frame immediately adjacent the lower and rearward portions of the auger, thereby permitting the auger to free itself of any momentary jamming effects which might otherwise result when an unusually heavy area of crop material is being cut for example.

Still another object of the invention is to provide crop conditioner means which are connectable to a tractor by support means independently of that which supports the crop header and arranged to position the conditioner means rearwardly of the header to receive consolidated material therefrom and treat the same primarily to facilitate drying thereof prior to discharge onto a field in a windrow.

Ancillary to the foregoing object, it is another object to provide crop transfer means extending between the exit means of the header and the entrance of the crop conditioner unit to insure transferring the consolidated material from said header to said conditioner unit, said transfer means comprising inter-related and coengageable elements respectively supported by the header and conditioner unit to permit movement of the header relative to the conditioner unit without disrupting the continuous transfer of the consolidated material from the header to the conditioner unit by said transfer means.

One further object of the invention ancillary to the latter objects set forth above is to provide curtain means extending upwardly from the entrance of the conditioner unit and thereby cooperate with the transfer means to insure the guiding of consolidated material from the exit of the header to the entrance of the conditioner unit and prevent any of the material from passing over the conditioner unit. In the preferred embodiment of the invention, such curtain means are adjustably mounted for variable positioning thereof to insure that said curtain means will function as intended regardless of variable vertical movement of the crop header with respect to the conditioner unit as the tractor carrying said equipment moves over a field and the header conditions itself to the irregularities in the field so as always to cut the material preferably close to the ground regardless of the irregularity, within reasonable limits, of the contour of the ground.

Still another object of the invention is to provide certain details of construction in the transfer means extending between the exit of the header and the entrance of the conditioner unit by which the foregoing objectives are achieved, certain of said details also relating to drive means for the conditioner unit which comprises yieldably coengageable rollers and also drive means for the auger and reel.

Details of the foregoing objects and of the invention, as well as other objects thereof, are set forth in the following specification and illustrated in the accompanying drawings comprising a part thereof.

In the drawings:

FIG. 1 is a plan view of the auger header and a fragmentarily illustrated forward portion of a crop conditioner unit, said header and unit being attachable to the forward end of a tractor of which only a very limited portion is illustrated.

FIG. 2 is a view similar to FIG. 1 but showing the auger removed from the header so as to illustrate certain details of construction of the later which are disposed below the auger.

FIG. 3 is a side view, partly in vertical section, taken on the line 3—3 of FIG. 1, of both the header and conditioner unit as they appear in normal operative position with respect to a field being harvested, the forward end of an exemplary tractor being illustrated fragmentarily at the right-hand side of said figure.

FIGS. 4 and 5 are side views of the apparatus shown in FIG. 3 but using a smaller scale than employed in FIG. 3 and respectively showing particularly certain elements of the header in lowered and elevated operative positions, the view in FIG. 5 also being the position in which the header mechanism usually is disposed in moving the mechanism usually is disposed in moving the mechanism to and from a field to be harvested.

FIG. 6 is a view similar to FIG. 5 but, in full lines, showing certain elements of the header mechanism raised to a substantially elevated position, while in dotted lines, the same elements are shown in a lowered, operative position similar to that in FIG. 3, the purpose of this figure being to show the relative positions of certain inter-related members of transfer means for the passage of crops between the header and conditioner unit.

FIG. 7 is a side view of the header mechanism attached to a fragmentarily illustrated forward portion of a tractor, as seen from the opposite side thereof from that illustrated in FIG. 3, for purposes of illustrating certain details of drive mechanism.

FIG. 8 is a fragmentary end view, on a larger scale than employed in FIG. 7 and showing certain details of floating support for the auger.

FIG. 9 is a fragmentary vertical sectional view of the details shown in FIG. 8 as seen from the line 9—9 of said figure.

FIG. 10 is a fragmentary vertical sectional view showing certain details of the mechanism extending between the header and conditioner unit beneath the auger, as seen on the line 10—10 of FIG. 3 and employing a larger scale than in FIG. 3.

FIGS. 11 and 12 are fragmentary side views of the rearward portion of the header and forward portion of the conditioner unit to show different relative positions of curtain means employed to insure the positive feeding of consolidated material from the header to the conditioner unit regardless of different elevated positions of the header relative to the conditioner unit, said figures respectively showing the header in lower and substantially elevated positions.

FIG. 13 is a fragmentary cross-sectional view of the curtain means as seen on the line 13—13 of FIG. 11.

Referring particularly to FIGS. 1 through 3, only the forward portion of the tractor 10 is illustrated, the same preferably having a pair of transversely spaced driving wheels 12 which provide the principal support not only for the tractor but also the header mechanism 14 and the conditioner unit 16 which are respectively, independently supported by the forward portion of the tractor 10 by means to be described hereinafter.

The header 14 comprises a frame 18 of substantial width for purposes of permitting the header to harvest a swath of forage crops, or the like, of a substantial range of different widths within the range, for example, of between 10 and 16 or more feet. Particularly where the forage crop does not grow to substantial heights, it is more efficient and economical to cut a relatively wide swath of said material and then consolidate the same into a substantially narrowed windrow in which form the crop dries and from which it is fed to subsequent portable harvesting equipment. The frame 18 has opposite sides 20 and 22, which are of substantial length, extending forwardly from the tractor 10. Said frame is supported preferably for floating substantially vertical movement to enable the sickle bar assembly 24 normally to be positioned close to the exemplary ground surface 26 by the employment of skids or shoes 28 which are fixed to the frame 18 at opposite sides thereof. The sickle bar assembly 24 also extends between the opposite sides of the frame 18 so as to cut a swath of material substantially equal to the width of the frame 18.

The frame 18 is connected to and supported by the forward end of the tractor 10 by pairs of heavy links 30 and 32 which respectively extend from opposite sides of the tractor 10 and the links of each pair are spaced vertically above each other as best illustrated in FIG. 3, whereas the transverse spacing thereof is shown in FIGS. 1 and 2. By such arrangement of substantially parallel upper and lower links 30 and 32, the vertical movement of the header 14 with respect to the tractor 10 will be permitted while the header remains generally horizontal in all vertical positions of operation.

In the preferred mounting of the header 14 with respect to the forward end of tractor 10, although the header normally substantially rides upon shoes 28 which slide over the ground, the full weight of the header is by no means sustained by the shoes 28 in that appropriate tensioning means, not shown, extending from the forward end of the tractor 10 to the lower links 32 and illustrated in exemplary manner by fragmentary link 34, see FIG. 3, sustains the majority of the weight of the header 14. Further, the fragmentary link means 34 are intended to exemplify certain elevating mechanism, not shown in detail, but supported by the forward portion of tractor 10 and arranged to be operated to move the header 14 from its lowermost operative position, as illustrated in FIG. 3, to various elevated positions illustrated in exemplary manner in FIGS. 5 and 6, other intermediate positions also being possible. Such tensioning and elevating mechanism is not an essential part of the present invention and thus details are not believed to be required.

To facilitate the movement of crop material toward the sickle bar assembly 24, a conventional reel 36 extends between the opposite sides of frame 18 and is rotatably supported for movement about an axis fixed with respect to frame 18. The reel preferably is of the type having rows of tines 37 extending from pivoted rods actuated by cams, not shown in detail, in the ends of the reel to cause the rows of tines 37 to produce a motion such as illustrated in FIG. 3, in broken lines, wherein it will be seen that the tines actually somewhat rake and impel the cut crop material up toward the auger consolidating means, and then release the material, just before engagement by the auger. Such consolidating means now will be described.

Also supported by frame 18 rearwardly of the reel 36, upwardly from and rearwardly of the sickle bar assembly 24, is an auger 38, the axis of which is substantially parallel to that of reel 36 and the auger extends between the opposite sides of the frame 18 as is clearly shown in FIG. 1. Said auger comprises a central tube 40 and coaxial therewith at opposite ends, are axle means 42 which are rotatably supported in appropriate bearings 44 supported at the opposite sides 20 and 22 of the frame 18 in a manner to be described hereinafter.

A plurality of helical flights 46 respectively extend inwardly from the opposite ends of the auger 38 and preferably terminate short of the central portion of the tube 40, said flights being oppositely spiraled as is best shown in FIG. 1. Said flights are connected in any appropriate manner to the central tube 40, as clearly shown in FIG. 3. The central portion of tube 40 preferably has means by which a plurality of substantially radially extending paddles 48 may be detachably connected to said tube, whereby when the header is used without employment of the conditioner unit 16, the paddles 48 may be removed because they normally are not required under such circumstances.

Also extending transversely between the opposite sides of frame 18 is an arcuate shield 50 which is disposed adjacent the lower and rearward portions of the peripheral confines of the helical flights 46, but, as best shown in FIGS. 3–6, the shield is at least slightly spaced from such confines. The shield 50 is fixedly connected to frame 18 for support thereby and, intermediately of the ends thereof, is provided with an exit opening 52, see FIGS. 1 and 3, which is substantially narrower than the full width of the shield 50. In side elevation, as illustrated in FIG. 3, said shield etxends through an arc substantially between about 2 o'clock and 8 o'clock, whereby the arc is almost 180° in circular extent. Said opening serves to discharge a full swath of cut forage material which has been consolidated by the auger approximately to about one-third of the width of the original swath, as readily can be seen by the exemplary proportions illustrated in FIG. 1.

To insure the passage of cut material smoothly and efficiently from the sickle bar assembly 24 to the shield 50, and especially to insure that the cut material will pass beneath the central tube 40 of auger 38, the present invention provides an upwardly and rearwardly extending guide means 54 which, at its lower forward end receives the cut material and directs the same upwardly and rearwardly to the forward edge of the shield 50. To accomplish the desired purpose of insuring the feeding of material beneath the central tube 40 of the auger, it will be seen that the guide means 54, which extends continuously between the opposite sides of frame 18, slopes upwardly and rearwardly substantially tangentially toward the periphery of the central tube 40 and then is connected to the forward edge portion 56 of shield 50 which is curved downwardly away from the auger 38 as clearly shown in FIG. 3.

The guide means 54, in association with the rearward curved portions of shield 50, thus presents somewhat of an ogee curve configuration which serves to smoothly guide the cut material into engagement by the auger 38 and in a manner by which especially the stems of forage material, as well as the bulk of the cut material, moves under the auger tube, whereby the spiral flights 46 can operate effectively to consolidate the material laterally toward the central portion of the shield 50 for discharge through the exit opening 52. The kicking action of the rows of tines 37 of reel 36 adjacent auger 38, as illustrated in FIG. 3, wherein the path thereof is shown in a continuous broken line, also greatly aids in directing the material beneath the tube 40 of the auger.

Power to drive the various movable items on the header 14 is derived from a power takeoff element 58, see FIG. 1, which is directly connected to the engine of the tractor, not shown, and thus the power means is only fragmentarily illustrated in FIG. 1. Such power means is commonly referred to as a P.T.O. As also shown in FIG. 1, said P.T.O. 58 drives a shaft 60 and, through appropriate universal joints and an intermediate drive shaft 62, power is furnished to a drive shaft 64 rotatably supported by the rear portion of frame 18. Through suitable mechanism 66 of known type, which is driven by shaft 64, oscillation of shaft 68 is produced to reciprocate the cutter bar of the sickle bar assembly 24.

Shaft 64, which revolves unidirectionally, by means of appropriate pulleys or sprocket gears and through the use of an endless belt or sprocket chain 70, drives the axle means 42 shown at the right-hand end of FIG. 1, for rotating the auger 38 unidirectionally, said direction being such as to cause the auger to consolidate the material from the outer ends of the arcuate shield 50 toward the central exit opening 52 while primarily passing beneath tube 40.

Another suitable pulley or sprocket gear 72 is fixed to the opposite end of axle means 42 of the auger and, as seen at the left-hand end of FIG. 1, drives a suitable endless flexible belt or sprocket chain 74 for purposes of driving the reel 36 through the means of another pulley or sprocket gear 76. By such mechanism, the reel 36 is driven continuously in a direction to engage the oncoming crop to be cut and impell the same toward the sickle bar assembly 24.

Due to the fact that the reel 36 and auger 38 are commonly supported for rotation by the frame 18, these elements, with the frame 18, preferably are suspended in a floating manner by the means described above in order to closely follow the contour of the ground as it is engaged by the shoes 28. In order to accomplish this while maintaining constant driving of the auger and reel, the intermediate drive shaft 62 preferably is of the longitudinally extensible and contractable type, as is a common expedient in equipment of this type.

Recognizing the fact that the density of a crop to be harvested is not constant throughout a field, and due to the fact that there will be areas in a field were the crop may be substantially more dense than at other locations, suitable compenstion is contemplated in the present invention to prevent damage to the equipment and also to accommodate such variations in the quantity of material which must be consolidated by the auger 62. To accomplish this, the auger 38 is mounted in a floating manner with respect to the opposite sides 20 and 22 of frame 18. As shown in FIG. 1, in plan view, but as best shown in elevation in FIGS. 7 and 8 which are side elevations as seen from the left end of the device illustrated in FIG. 1, similar arms 78 extend substantially horizontally and are pivotally connected at the forward ends thereof, by suitable shoulder bolts 80, or the like, to the frame members 20 and 22, see FIG. 1.

The bearings 44 for the axle means 42 at opposite ends of auger 38 are supported by the ends of arms 78 opposite the pivoted ends. The opposite side members 20 and 22 of the frame 18 have arcuate openings 82 therein of limited, but adequate length to permit a satisfactory amount of floating movement of the auger 38 upwardly, away from the arcuate shield 50. Such movement is controlled entirely by the bulk of the material being engaged by the auguer 38 at any particular time and as soon as a bulk of unusual size passes through the auger, after causing it to be momentarily elevated for example, the weight of the auger is such that it normally will settle to its lowest position within the arcuate openings 82.

Guided movement of the rearward, movable ends of the arms 78 is controlled by suitable vertical guide members 84 which are spaced from the end members 20 and 22 of the frame of the header sufficiently to accommodate the thickness of the arms 78. The normal spacing between the periphery of the flights 46 of the auger with respect to the lower portion of arcuate shield 50 preferably is controlled by adjustably positionable stop elements 86 conveniently formed in the nature of wedges having surfaces complementary to certain ones on said arms engaged thereby. As seen from FIG. 8, horizontal slots 88 may be provided in the wedges 86 and a clamping bolt 90, which secures the lower end of one of the guide members 84 in operative position, can be utilized to maintain the stop elements 86 in any desired adjusted position.

Notwithstanding the fact that the auger 38 is arranged for limited floating movement with respect to the arcuate shield 50, substantially constant driving of the auger by the endless flexible means 70 is assured due to the fact that the drive shaft 64, axle means 42 of the auger, and the pivots 80 of the arms 78 are substantially in a line of centers as is clearly seen from FIG. 7, whereby limited upward movement of the auger 38 as permitted by the arcuate openings 82, will not adversely affect the driving capabilities of the endless flexible means 70 to any appreciable extent. Similarly, since the axle means 42 of the auger, the pivots 80 of the auger-supporting arms 78, and the axle of the reel 36 are substantially on a line of centers as shown in FIG. 7, no appreciable adverse affect of the driving capabilities of the endless flexible means 74 will result from limited upward movement of the auger 38 away from stop elements 86.

On occasions when it is not desired to employ crop conditioner means, the header mechanism described hereinabove may be utilized in the manner described, wherein the cut and consolidated material will be discharged through the exit opening 52 onto the ground and passed beneath the tractor in the form of a windrow of suitable width. However, when crops particularly having thick stems, such as alfalfa and the like, are being harvested, it is desirable to crush and break the stems of said crops to enhance the drying thereof and thereby prevent molding, as well as insure more uniform drying throughout bales of the material after baling has occurred. Accordingly, the present invention contemplates the use of crop conditioning means referred to hereinabove as conditioner unit 16. Details of said unit are best illustrated in FIGS. 3–6 and 11–13. A fragmentary forward portion of the same likewise is shown in FIG. 1 and especially therein it will be seen that the unit 16 is approximately commensurate in width to the discharge opening 52 due to the fact that the conditioner unit handles the consolidated material continuously discharged through the exit opening 52.

Conditioning unit 16 comprises a frame 92 having opposite parallel sides. The frame 92 is supported directly by the forward, central portion of the tractor 10 which is fragmentarily illustrated in FIGS. 11 and 12. Suitable pivot means 94, shown in said figures, diagrammatically illustrate suitable supporting means for opposite sides of the frame 92, whereby raising and lowering of the forward end of the conditioner frame 92 may be accomplished as when the header mechanism 14 is elevated. For example, suitable means, such as coil springs 96, of substantial strength, may be positioned to somewhat serve as linkage means between loops 98 on the upper portions of the forward end of conditioner frame 92 and the upper links 30 by which the header mechanism is movably supported by the forward end of the tractor 10 but independently of the support provided for the conditioning unit 16. At least limited movement of the forward end of the conditioner unit substantially in a vertical direction incident to vertical floating movement of the header mechanism 14 is desirable for purposes of maintaining the vertical position of the entrance end of the conditioner unit reasonably coordinated with the discharge opening 52 of the header mechanism 14.

When the conditioner unit 16 is employed, rather than discharge the consolidated material from the exit opening 52 of the header mechanism 14 directly onto the ground, appropriate transfer means 100 are employed, details of which are best shown in FIGS. 3–6. Essentially, said transfer means comprises elements which are co-related in such a way as to provide a substantially U-shaped channel in cross-section, opening upwardly. Because of the nature of the supporting means for the header mechanism 14 which permits substantial vertical movement and considerably less vertical movement is contemplated for the forward, entrance end of the conditioner unit 16, it is essential that at least limited flexibility be incorporated in the transfer means 100 and the present invention provides simple yet highly effective mechanism to satisfy this requirement.

The transfer means 100 comprises a bottom plate 102 having angularly related support members 104 fixed to and underlying plate 102, the rearward ends of members 104 being pivotally connected to the forward end of the frame of conditoner 16 by pivot means 106. Also extending upwardly from the opposite side edges of bottom plate 102 are side wings 108 of limited height. The forward ends of the side members of conditoner frame 92 also have transversely extending guard plates 110 thereon which extend around drive mechanism, not shown, for the crushing rollers 112 and 114 of the conditioner unit 16. Affixed to and extending forwardly from guard plates 110 are additional side wings 116 which, as best seen in FIG. 2, are disposed adjacent but outwardly of side wings 108 on bottom plate 102. Thus, a certain amount of overlapping of said side wings is provided to prevent any appreciable outward leakage of material while moving to the crushing rollers.

The forward edge 118 of bottom plate 102 preferably is curled to render it substantially tubular and thereby afford adequate resistance to bending. Said edge rests upon supporting structure of an articulated nature which preferably is only employed when the tractor is provided with the conditioning unit 16, whereby said supporting structure is readily attachable to the inner surfaces of brackets 120 on the lower portions of header mechanism 14 and extending rearwardly from the sickle bar assembly 24 for pivotal connection with the forward ends of the lower heavy links 32. Said supporting mechanism, as best seen from FIG. 2, comprises a central, longitudinally extending, short tongue 122 which is connected to and extends forwardly from the forward end of bracing members 104, whereby the same is rigid with bottom plate 102. The forward portion of tongue 122 slides longitudinally within a hollow swivel block 124 which, as shown in detail in FIG. 10, is substantially rectangular in outline. To facilitate construction thereof, it will be seen that the tongue 122 also may comprise a channel member of such dimension as to be slidable suitably within the interior of the hollow rectangular swivel block 124.

The swivel block 124 is provided with a pair of transversely and oppositely projecting, axially aligned trunions 126 which pivotally receive the rearward ends of rearwardly and inwardly extending bracing rods 128, said rearward ends 130 preferably being flattened and arranged in spaced, parallel relationship to each other, the same having bearing openings therein to receive the trunions 126. To insure the maintenance of pivotal connection means between said rearward ends of bracing rods 128 and trunions 126, a U-shaped tie member 132 is connected to the rods 128 adjacent the rear ends thereof, thereby connecting the bracing rods 128 into a unitary assembly. The forward, outer ends of rods 128 preferably are provided with integral, connecting facings 134 which, as best seen in FIG. 3, are complementary to, and connectable by suitable bolts 136, to the inner surfaces of the brackets 120 on the header. By virtue of the pivotal nature of swivel block 124 and the slidable co-engagement thereof by tongue 122, vertical floating movement of header 14 with respect to the tractor and also with respect to the conditioner unit 16, readily may take place even though the bracing members 104 are pivotally connected to the conditioner unit 16 and the bracing rods 128 are fixedly connected to the header mechanism 14.

The header mechanism 14 also is provided with part of the transfer means by which material is conducted from the header exit 52 to the conditioner unit 16. That portion of the transfer means which is carried by header mechanism 14 comprises a front bottom plate 138 which, at its forward edge 140, is pivotally connected to the rearward edge of a closure plate 142 which extends between the opposite sides of exit opening 52 in the auger shield 50 and also extends from the forward edge of said opening rearwardly a limited distance. Any suitable means may be employed to connect the closure plate 142 to said edges of the forward portion of exit opening 52.

The rearward edge of the front bottom plate 138 slidably rests upon the upper surface of bottom plate 102, the opposite side edges of said plate 138 also being movable with respect to side wings 144 which extend rearwardly and transversely from the arcuate shield 50, as clearly seen in FIGS. 3–6. From FIG. 2, wherein said wings are shown in plan view, it also will be seen that they are disposed inwardly from the side wings 108 at the opposite side edges of bottom plate 102 and also inwardly of the additional side wings 116 which are fixed to the forward ends of guard plates 110 of header unit 14. Thus, it will be seen that the overlapping and cooperating side plates 108, 116 and 144 constitute cooperating members forming opposite sides of the channel-like transfer means by which material is conveyed between the auger of the header and the crushing rolls 112 and 114 of the conditioner unit 16, and the cooperating bottom plates 102 and 138 form the bottom of said channel-like transfer means. The various members constituting the channel-like transfer means also are movable with respect to each other so as to afford a flexible type of transfer means permitting ample and ready floating movement of the header mechanism 14 relative to the tractor and conditioner unit 16.

To cooperate with the channel-like transfer means described above, the present invention also contemplates the use of curtain means 146, details of which are best illustrated in FIGS. 11–13. Said curtain means preferably are employed to prevent material from over-shooting the upper crushing roller 112 of conditioner unit 16. The upper roller 112 preferably is floatingly supported by arms 145, the rearward ends of which are pivotally connected at 148 to the opposite sides of conditioner unit frame 92 and suitable means such as coil springs, not shown, which are commonly employed in crushing roller mechanism of said type, constantly urge the upper crushing roller 112 downwardly toward the lower roller 114. Accordingly, the lower edge of curtain 146, which preferably is flexible is connected to a transverse bar 150 which, for example, extends between and is connected at its opposite ends 152 to any suitable portion of the forward end of the frame 92 of the conditioner unit, such as the inner surfaces of guard plates 110. The connection of the lower edge of the curtain 146 to bar 150 may be effected by any suitable means such as rivets 54 shown in exemplary manner in FIG. 13.

The curtain 146, being flexible, may be formed from any suitable material such as durable canvas, woven or twisted wire cloth of suitable mesh size, or even flexible sheet metal of suitable nature. From FIGS. 11 and 12 particularly, it will be seen that the lower edge of screen 146, as determined by lower supporting bar 152, is disposed adjacent the mid-portion of the forward surface of upper crushing roller 112 and extends upwardly therefrom. Hence, guiding of the upper portion of the consolidated crop material to the entrance of the conditioner unit 16, between the crushing rollers 112 and 114 is assured.

The upper edge of the flexible curtain 146 is supported by upper transverse bar 156, the opposite ends of which preferably extend beyond the opposite edges of curtain 146, as shown in FIG. 13, and suitable tensioning means such as coil springs 158 are connected at their lower ends to said opposite ends of bar 156, while the upper ends thereof are connected to suitable supporting means carried, for example, by the uppermost connecting links 30.

As the header mechanism 14 either floatingly moves vertically between the exemplary positions shown, for example, in full and broken lines in FIG. 11, it will be seen that the bottom plates 102 and 138, especially when the header mechanism 14 is elevated, will have a greater tendency than otherwise to cause the material being transferred to the crushing rollers to overshoot the upper roller 112. To prevent this from occurring however, an elongated roller 160 is supported between a pair of transversely spaced bracket arms 162 which are connected to the rearward portion of frame 18 of the header mechanism 14. Thus, especially as illustrated in broken lines in FIG. 11, wherein the header mechanism 14 is shown in elevated position, the raising of the frame 18 correspondingly raises bracket arms 162 and roller 160 which, correspondingly, as is clearly evident from the broken line illustration in FIG. 11, moves the upper end of curtain 146 to a more vertical position than that which it occupies when the header mechanism 14 is in a more depressed position shown in full lines in FIG. 11.

When in the more vertical broken line position of FIG. 11, it is obvious that the curtain 146 will be more advantageously positioned for purposes of deflecting any material which tends to overshoot the upper roller 112 down into the entrance of the conditioner unit 16 so as to pass between the crushing rollers 112 and 114. It thus will be seen that the variable positioning of the flexible curtain 146 so as to most advantageously prevent undesirable tendencies of the material to overshoot the upper crushing rollers 112 is accomplished automatically by roller 116 and its actuating mechanism.

From the foregoing, it will be seen that the present invention affords numerous advantages with respect to treating forage crops to facilitate the harvesting and arrangement thereof in a windrow upon a field, either with or without subjecting the same to conditioning means for purposes of crushing or otherwise facilitating the drying of crops and especially those having relatively thick stems. The described mechanism employs means to facilitate the delivery of the cut material to the auguer beneath the axis thereof and the auger is floatingly mounted to readily accommodate the same, without damage to its mounting means, to periodic increases in the bulk of the material being consolidated by the auger. Transfer means extending between the exit of the header mechanism to pass the consolidated material to a conditioning unit, when supported by the propelling tractor independently of the header mechanism, are of such nature as to permit substantial and independent movement of the header mechanism relative to the conditioner unit without disrupting the functioning and effectiveness of such transfer mechanism. Positive forcing of the consolidated material through the discharge opening 52 is assured by the paddle arrangements 48, detachably connectable to the central portion of auger 38. To further insure fool-proof directing of consildated products to the crushing rollers of the conditioner unt 16, curtain means also are provided which are automatically positionable to the most advantageous position therefor commensurate with the vertical position of the header mechanism with respect to the ground and the conditioner unit 16.

While the invention has been described and illustrated in its several preferred embodiments, it should be understood that the invention is not to be limited to the precise details herein illustrated and described since the same may be carried out in other ways falling within the scope of the invention as claimed.

We claim:

1. A crop header arranged to be supported by the forward end of a tractor and comprising in combination, a frame of substantial width, means attachable to a tractor and connected to said frame to support it for vertical movement relative to the ground, a sickle bar assembly supported by the lower portion of said frame and extending between the opposite sides thereof to cut a swath substantially as wide as said frame, an auger extending horizontally between the opposite sides of said frame, arms pivoted at one end respectively to said opposite sides for movement about a fixed axis to provide limited free floating movement of the opposite ends of said arms substantially in a vertical direction, bearings in said opposite ends of said arms supporting the opposite ends of said auger for rotation about a substantially horizontal axis above and rearwardly of said sickle bar assembly and said arms being operable to permit limited free floating movement of said auger upwardly relative to said frame, said auger having oppositely spiraled helical flights extending inward from opposite ends thereof, an arcuate shield adjacent the lower and rearward peripheral portions of said auger and said limited floating support of said auger permitting yielding movement thereof away from said shield, means to rotate said auger in a direction to consolidate cut crop material from the ends toward the center of said auger as received by said shield, guide means extending upwardly and rearwardly from said sickle bar assembly toward said auger and connected at the upper end thereof with the forward portion of said arcuate shield to insure the feeding of cut crop material beneath the axis of said auger, and exit means in said shield substantially centrally between the opposite ends thereof and appreciably shorter axially than the length of said auger and frame, the material consolidated transversely by the flights of said auger being discharged through said exit means rearwardly of said auger as a continuous consolidated row of material substantially narrower than the cut swath from which it is formed.

2. The header according to claim 1 in which adjustable means are supported by said opposite ends of said frame for interengagement by the movable ends of said arms to limit the downward movement of said auger toward said arcuate shield.

3. The header according to claim 1 in which a reel is rotatably supported by said frame forwardly of said auger and sickle bar assembly, and endless flexible belt-like drive means extending from said auger to said reel to drive the same in unison therewith, said drive means and arms for pivotally supporting said auger being arranged to permit limited floating movement of said auger while maintaining effective driving of said reel.

4. The implement according to claim 3 in which the pivotal axis of said arms is between and substantially in a line of centers with the axes of said auger and reel.

5. A crop header unit arranged for support by the forward end of a tractor and comprising, a frame of substantial width, means movably connectable to the forward end of a tractor for vertically yieldable support thereby and connected to said frame for support thereof by said forward end of said tractor when connected thereto, a sickle bar assembly supported by the lower portion of said frame and extending between the opposite sides thereof, an auger extending horizontally between the opposite sides of said frame above and positioned rearwardly of said sickle bar assembly, said auger having oppositely spiraled helical flights extending inward from opposite ends thereof, means to rotate said auger in a direction to consolidate cut crop material from the ends toward the center of said auger, means extending from said sickle bar toward said auger to guide cut material thereto for consolidation, and exit means arranged substantially centrally between the opposite ends of said auger and of appreciably shorter length than said auger and frame to discharge the consolidated material rearwardly from said auger, the vertically yieldable support for said frame permitting said crop header unit to conform to the contour of a field, in combination with a crop conditioner unit having support means connectable to the forward end of said tractor for limited yieldable vertical movement to support said conditioner unit by said forward end of said tractor independently of said crop header unit and rearwardly thereof, and flexible channel-like transfer means extending between said exit means of said crop header unit and said conditioner unit to insure guided passage of consolidated material to said conditioner unit for treatment thereby prior to discharge of the material in a windrow upon the ground beneath the tractor, said flexible transfer means comprising a plurality of relatively movable side and bottom forming plate members overlapping each other and respectively supported by said crop header unit and conditioner unit, guide means extending upward from the entrance of said conditioner unit and operable to prevent cut material discharged from said header unit overshooting said entrance to said conditioner unit, and means flexibly supporting said guide means to accommodate the same to any limited vertical movement occurring between said conditioner unit and crop header unit.

6. The combined header and conditioner unit according to claim 5 in which said conditioner unit comprises a frame connectable to the forward end of said tractor for limited pivotal movement, a pair of horizontal crushing rollers supported by said frame for rotation relative to each other, and said transfer means comprising a pair of adjustably coengageable bottom plates respectively supported by said frames of said header and said conditioner units and extending toward each other into said overlapping relationship, and bracing means beneath said plates and extending between and interconnected to said header and conditioner units.

7. The combined header and conditioner unit according to claim 6 in which said header and conditioner unit respectively have movably associated side plates connected to and extending upwardly from the opposite edges of said bottom plates of said transfer means and cooperating with each other and said bottom plates to render said transfer means channel-like.

8. The combined header and conditioner unit according to claim 5 further including flexible curtain means extending upwardly from the entrance between said crushing rollers of said conditioner unit and operable to enhance the guiding and feeding of consolidated material from said transfer means to said entrance between said crushing rollers.

9. The combined header and conditioner means according to claim 8 further comprising an implement and including means on said implement engageable with said flexible screen and operable to vary the position thereof in accordance with the relative positions of said header and conditioner unit to insure guiding and feeding of material to the entrance of said conditioner rollers regardless of the vertical position of said header relative to said conditioner unit.

References Cited
UNITED STATES PATENTS

| | | | |
|---|---|---|---|
| 2,476,265 | 7/1949 | Peterson | 56—158 |
| 2,696,290 | 12/1954 | Carroll | 198—9 |
| 2,822,656 | 2/1958 | Rogers | 56—208 |
| 3,224,177 | 12/1965 | Adee | 56—23 |

ABRAHAM G. STONE, *Primary Examiner.*

P. A. RAZZANO, *Assistant Examiner.*